United States Patent
Su et al.

(10) Patent No.: US 8,237,860 B2
(45) Date of Patent: Aug. 7, 2012

(54) POOR VIDEO EDITING DETECTION SYSTEM

(75) Inventors: Te-Sung Su, Jhubei (TW); Yen-Lin Chen, Sindian (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1231 days.

(21) Appl. No.: 12/010,462

(22) Filed: Jan. 25, 2008

(65) Prior Publication Data

US 2008/0180570 A1    Jul. 31, 2008

(30) Foreign Application Priority Data

Jan. 29, 2007    (TW) ................................ 96103170 A (51) Int. Cl.
*H04N 11/20* (2006.01)
(52) U.S. Cl. ........................ 348/452; 348/448
(58) Field of Classification Search .................. 348/452, 348/448, 700, 458, 558, 447, 459, 702, 722, 348/390, 399, 409, 415, 845, 451
See application file for complete search history.

(56) References Cited

U.S. PATENT DOCUMENTS

| | | | | |
|---|---|---|---|---|
| 6,014,182 A | * | 1/2000 | Swartz | 348/700 |
| 6,356,587 B1 | * | 3/2002 | Choi | 375/240 |
| 6,441,812 B1 | * | 8/2002 | Voltz | 345/213 |
| 6,859,237 B2 | | 2/2005 | Swartz | |
| 7,522,221 B2 | * | 4/2009 | Swartz | 348/700 |

* cited by examiner

*Primary Examiner* — Annan Shang
(74) *Attorney, Agent, or Firm* — Bacon & Thomas, PLLC (57) ABSTRACT

A system for detecting poor video editing detects a television (TV) image signal. When a TV image originates from a film signal rather than a video signal, a de-interlacing device performs a de-interlacing at a film signal mode to thereby increase a vertical resolution of a TV image signal. A sawtooth detector can detect a poor video editing, which causes a sawtooth occurrence to TV image signals, on an unbroadcasted TV image signal. Accordingly, the poor video editing is found in advance. Also, the invention uses a scene change in combination with the sawtooth detector to thereby avoid a poor edited image and obtain a preferred image quality.

13 Claims, 8 Drawing Sheets

|  |  |  | Film Segment A |  |  |  |  | Film Segment B |  |  |  |  |  |  |  |
|---|---|---|---|---|---|---|---|---|---|---|---|---|---|---|---|---|
| Filed No. | 1 | 2 | 3 | 4 | 5 | 6 | 7 | 8 | 9 | 10 | 11 | 12 | 13 | 14 | 15 | 16 |
| Frame No. | a | a | a | b | b | c | c | c | d | e | e | f | f | f | g | g |
| Output of Film Pattern Detector | 1 | 0 | 0 | 0 | 0 | 1 | 0 | 0 | 0 | 0 | 0 | 1 | 0 | 0 | 0 | 0 |

POOR VIDEO EDITING DETECTION SYSTEM

BACKGROUND OF THE INVENTION

1. Field of the Invention

The present invention relates to a detecting system and, more particularly, to a system for detecting poor video editing.

2. Description of Related Art

Figure 1:
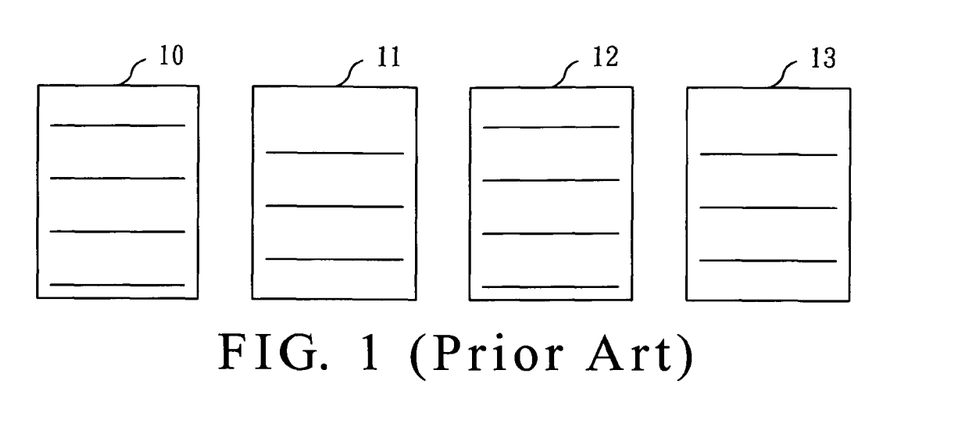
FIG. 1 is a schematic view showing display fields of a video signal.

For the limited broadcast bandwidth, current TV broadcasting typically uses alternate odd/even fields. As shown in FIG. 1, odd fields 10 and 12 have only odd-line video data, and even fields 11 and 13 have only even-line video data. New generation of TVs requires a higher vertical resolution, and accordingly a line doubler is used in a TV to perform a double frequency processing in order to increase the vertical resolution. The simplest double frequency processing is to directly merge adjacent odd and even fields to thereby form a progressive scan frame. However, because of a time difference between the adjacent odd and even fields, such a processing presents a sawtooth to a motion image.

To overcome the aforementioned problem, a line doubler preferably is equipped with a frame motion detector to detect a motion image. In addition, the line doubler can perform an inter-field interpolation of de-interlacing process on a still image and an intra-field interpolation of de-interlacing process on the motion image.

Figure 2:
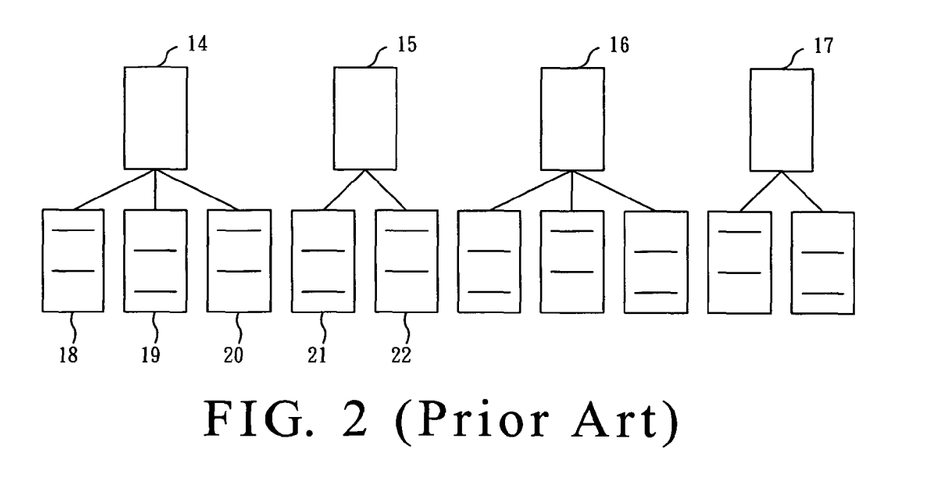
FIG. 2 is a schematic view of typical fields converted from a film signal.

Another double frequency processing is achieved by determining if an image originates from a film. It is known that a film is formed by recording 24 frames per second. Accordingly, for displaying a film signal on an NTSC TV, it converts the 24 frames into 60 fields per second. As shown in FIG. 2, such a conversion is typically referred to as a "3:2 pull down", i.e., two temporally successive film frames are converted into three fields and two fields respectively. For example, frame 14 is converted into field 18 (odd field), field 19 (even field) and field 20 (odd field), frame 15 is converted into field 21 (even field) and field 22 (odd field), and so on. Thus, upon such a double frequency processing, a perfect double frequency output can be obtained by combining all odd and even fields that correspond to the same frame when an image is determined to originate from a film signal. In this case, an image has no sawtooth and a motion image can have the highest vertical resolution.

Figure 3:
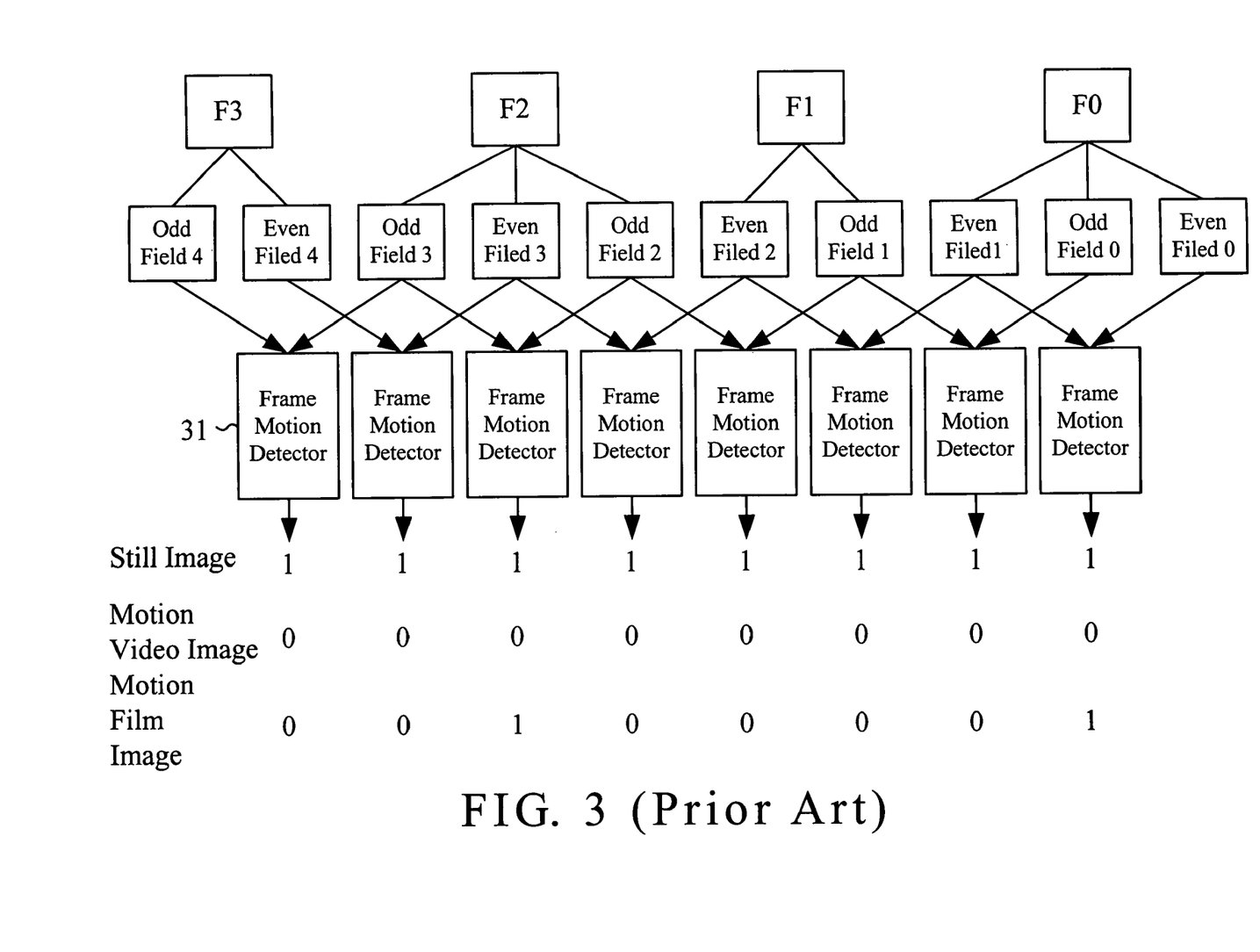
FIG. 3 is a schematic view of typically using a frame motion detector to provide the required frame motion data.

For detecting an image source, frame or field motion data is used to determine whether the image source is a film signal or not. FIG. 3 shows an example of using frame motion detectors 31 to provide the required frame motion data. As shown in FIG. 3, each frame motion detector 31 can detect two successive odd or even fields to thereby output '1' when the two successive odd or even fields are the same and '0' when different. Accordingly, if a TV image is a segment of still frames, whether the image source is a film signal or not, the frame motion detector 31 outputs a sequence '11111, 11111, . . . '. If the TV image is a segment of motion video signal, the frame motion detector 31 outputs a sequence '00000, 00000, . . . '. If the TV image is a segment of motion film signal, the frame motion detector 31 outputs a sequence '10000, 10000, . . . '.

Figure 4:
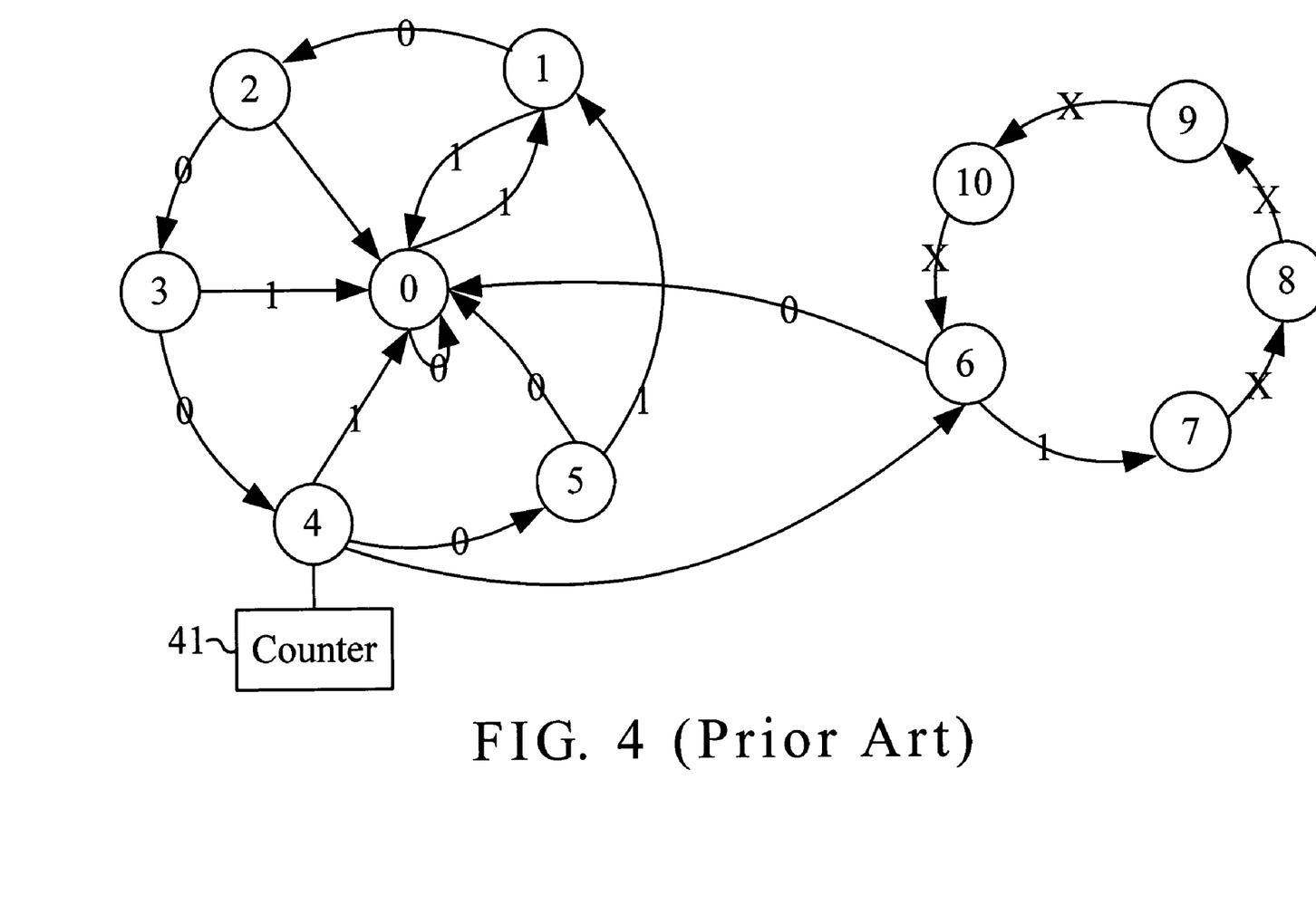
FIG. 4 is a film detection state transition diagram.

The output of the frame motion detector 31 is applied to FIG. 4 in which a film detection state transition diagram is shown, thereby determining if an input image is of a 3:2 pull down film. States 0-5 of the film detection state transition diagram are video mode states, and states 6-10 are film mode states. As shown in FIG. 4, the diagram starts at state 0. For every input with '10000', the state transition has to pass through state 4, which causes an increase on the counter 41. When the counter 41 exceeds a threshold, a state transition from state 4 to state 6 is performed, i.e., a TV image (video) mode state is changed into a film mode state.

As cited above, when an input image is of the 3:2 pull down film, the frame motion detector outputs '10000' or '1111'. When the frame motion detector outputs a certain amount of '10000', the film detection state transition diagram is changed from a video mode state to a film mode state and remains at the film mode state as long as the input is met with '1XXXX'.

Figure 5:
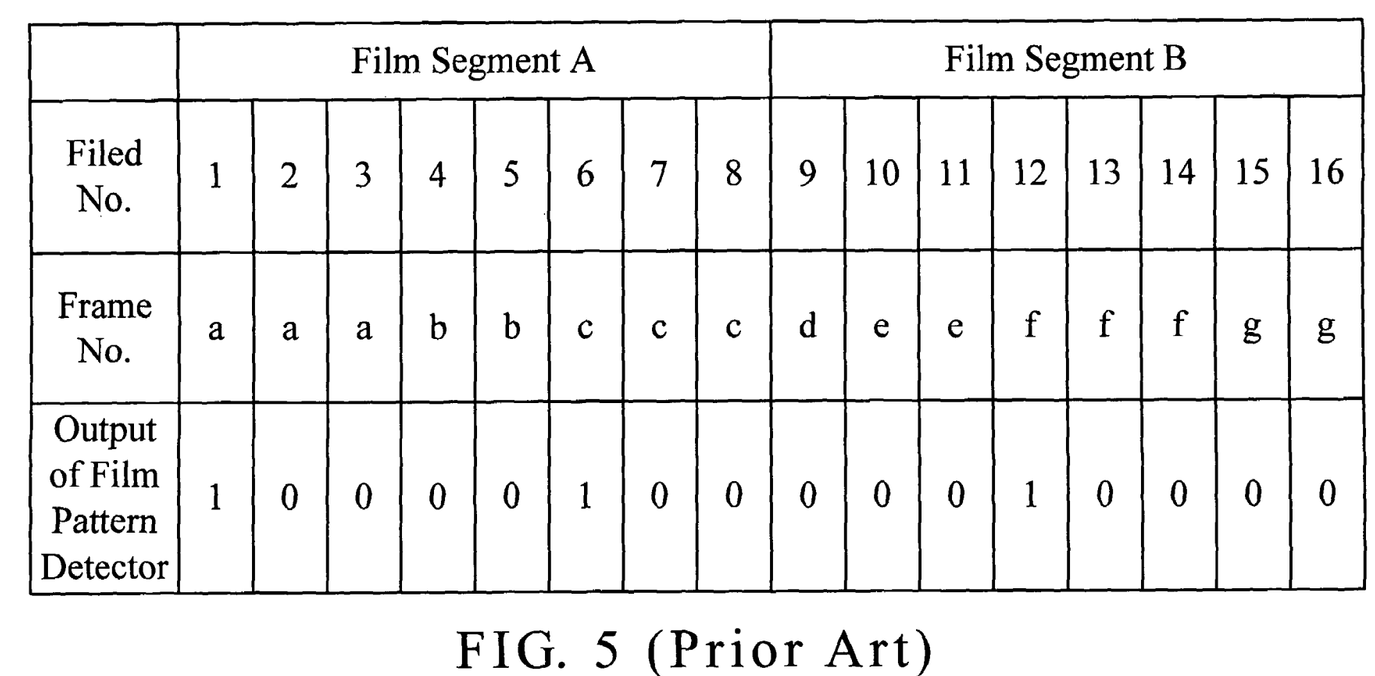
FIG. 5 is a schematic view showing a typical poor edited film signal.

The aforementioned technique can effectively detect whether an image originates from a film signal or not, and have a perfect double frequency output. However, it also causes the poor film editing, which impairs the 3:2 pull down proportion and outputs the image with a sawtooth. As shown in FIG. 5, fields 1-8 are from a film segment A, and fields 9-16 are from another film segment B. Due to a bad editing in the film segment B, field 9 and the following fields are not consistent with the 3:2 pull down process. Please refer again to FIG. 4 and the state transition diagram can only determine that the image is fit to the film mode at field 11. Therefore, when the field 9 is used as a basis to generate the television image, the field 9 and the field 10 originally from different film frames are combined into one image frame, and the television image incurs sawtooth effect as a result.

To overcome the aforementioned problem, U.S. Pat. No. 6,201,577 granted to Peter D. Swartz for a "Film source video detection" discloses a method for detecting a poor editing. The method detects the poor editing on a current output image and informs a film pattern detector to leave the film mode to thereby avoid combining two fields, which are not of a same frame, into a frame. However, such a detection is operated on the current output image, which cannot totally avoid an image from presenting a sawtooth because a line doubler outputs a frame with a sawtooth before a poor editing is detected. In addition, the prior art cannot leave the film mode in states 7-10 and thus possibly combines two fields of different frames into a frame, resulting in likely presenting a sawtooth to a TV image.

Therefore, it is desirable to provide an improved system for detecting poor video editing to mitigate and/or obviate the aforementioned problems.

SUMMARY OF THE INVENTION

An object of the present invention is to provide a system for detecting poor video editing, which can reduce the use amount of frame buffers and line buffers to thereby reduce the hardware cost.

Another object of the present invention is to provide a system for detecting poor video editing, which can detect and process various poor editing to thereby obtain a preferred image quality.

In accordance with one aspect of the present invention, there is provided a system for detecting poor video editing. The system receives plural fields of a video datastream for detecting a poor editing in the video datastream. The system includes a film mode detector, a sawtooth detector and a scene detector. The film mode detector receives a previous field F[N−1] and a next field F[N+1] respectively of the video datastream to accordingly determine whether the video datastream is of a film mode or not. The sawtooth detector receives a current field F[N] and the next field F[N+1] respectively of the video datastream to thereby determine whether a sawtooth is present to the next field F[N+1] based on a field energy of the current field F[N] and a frame energy of the current field F[N] and next field F[N+1]. The scene detector receives the current field F[N], the next field F[N−1] and the previous field F[N−1] in order to calculate a field brightness difference between the current field F[N] and the previous and next fields F[N−1] and F[N+1], and accordingly determines whether a scene change occurs. When the video datastream is of the film mode and the scene change occurs, the video datastream is determined to have the poor editing, for the poor editing mostly occurs at the scene change.

Other objects, advantages, and novel features of the invention will become more apparent from the following detailed description when taken in conjunction with the accompanying drawings.

DETAILED DESCRIPTION OF THE PREFERRED EMBODIMENT

Figure 6:
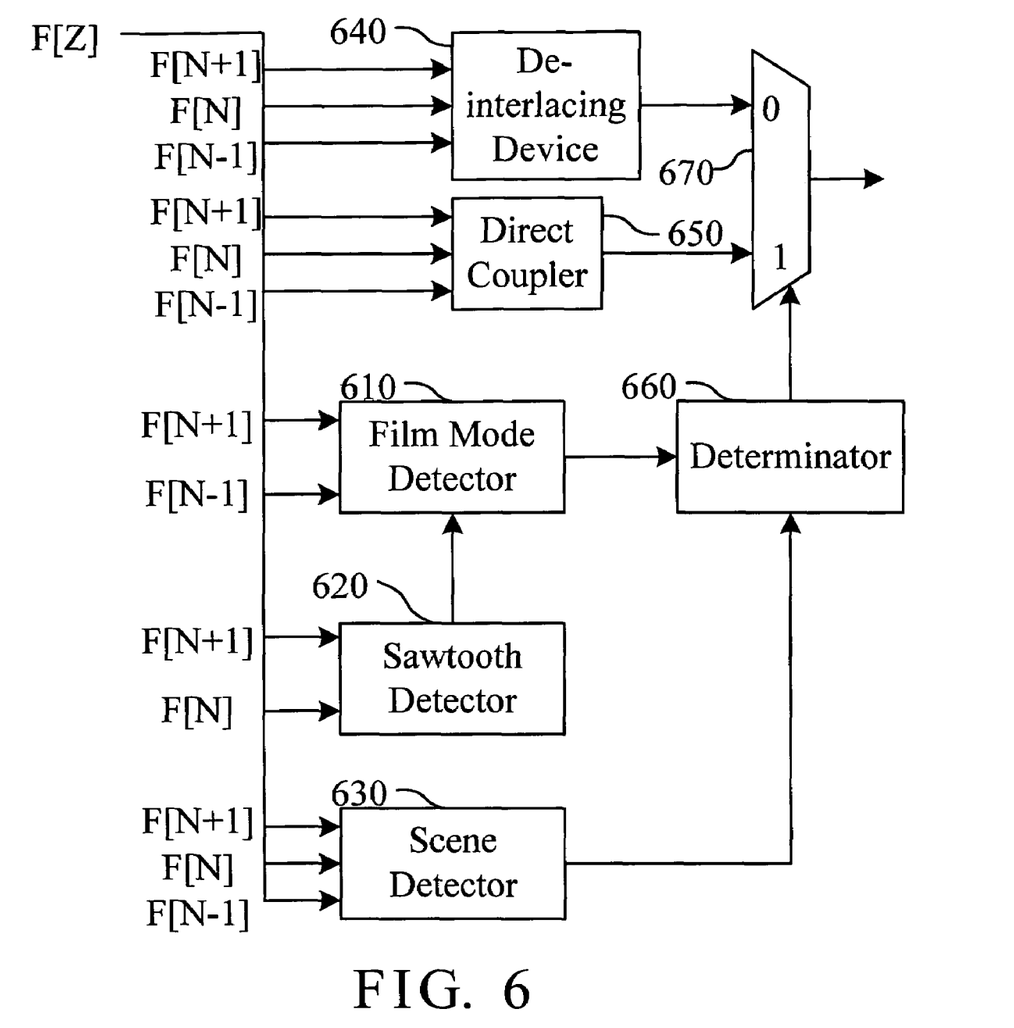
FIG. 6 is a block diagram of a system for detecting poor video editing in accordance with the invention.

FIG. 6 is a block diagram of a system for detecting poor video editing in accordance with the invention. As shown in FIG. 6, the system receives plural fields F[Z] of a video datastream for detecting a poor editing in the video datastream, wherein Z=N indicates a current field in processing. The system includes a film mode detector 610, a sawtooth detector 620, a scene detector 630, a de-interlacing device 640, a direct coupler 650, a determinator 660 and a multiplexer 670.

The de-interlacing device 640 receives a current field F[N], a previous field F[N−1] and a next field F[N+1] respectively of the video datastream and accordingly uses a de-interlacing to produce the frame for the current field F[N].

The direct coupler 650 receives the previous field F[N−1], the current field F[n] and the next field F[N+1] respectively of the video datastream to accordingly produce the frame for the current field [N] directly.

The film mode detector 610 receives the previous field F[N−1] and the next field F[N+1] respectively of the video datastream to accordingly determine whether the video datastream is of a film mode or not. When the video datastream is not of a film mode, the film mode detector 610 outputs states 0 to 5, and when the video datastream is of a film mode, the film mode detector 610 sequentially outputs states 6 to 10, i.e., film mode 6 to 10, which can be implemented by those skilled in the prior art in accordance with the state transition diagram of FIG. 4 and thus a detailed description is deemed unnecessary.

The sawtooth detector 620 receives the current field F[N] and the next field F[N+1] respectively of the video datastream to thereby determine whether a sawtooth is present to the next field F[N+1] in accordance with a field energy of the current field F[N] and a frame energy of the current field F[N] and next field F[N+1]. When the frame energy is greater than the number of pixels of the field energy of the current field F[N] and exceeds a threshold, the sawtooth detector determines that the sawtooth is present to the next field F[N+1].

The field energy of a pixel can be expressed by:

$$|\text{Luma}_{F[N]}[i][j] - \text{Luma}_{F[N]}[i+1][j]|, \quad (1)$$

where $\text{Luma}_{F[N]}[i][j]$ indicates a brightness of pixel (i, j) of the current field F[N] and $\text{Luma}_{F[N]}[i+1][j]$ indicates a brightness of pixel (i+1, j) of the current field F[N]. The frame energy of a pixel can be expressed by:

$$|\text{Luma}_{F[N]}[i][j] - \text{Luma}_{F[N+1]}[i][j]|, \quad (2)$$

where $\text{Luma}_{F[N]}[i][j]$ indicates a brightness of pixel (i, j) of the current field F[N] and $\text{Luma}_{F[N+1]}[i][j]$ indicates a brightness of pixel (i, j) of the next field F[N+1].

Figure 7:
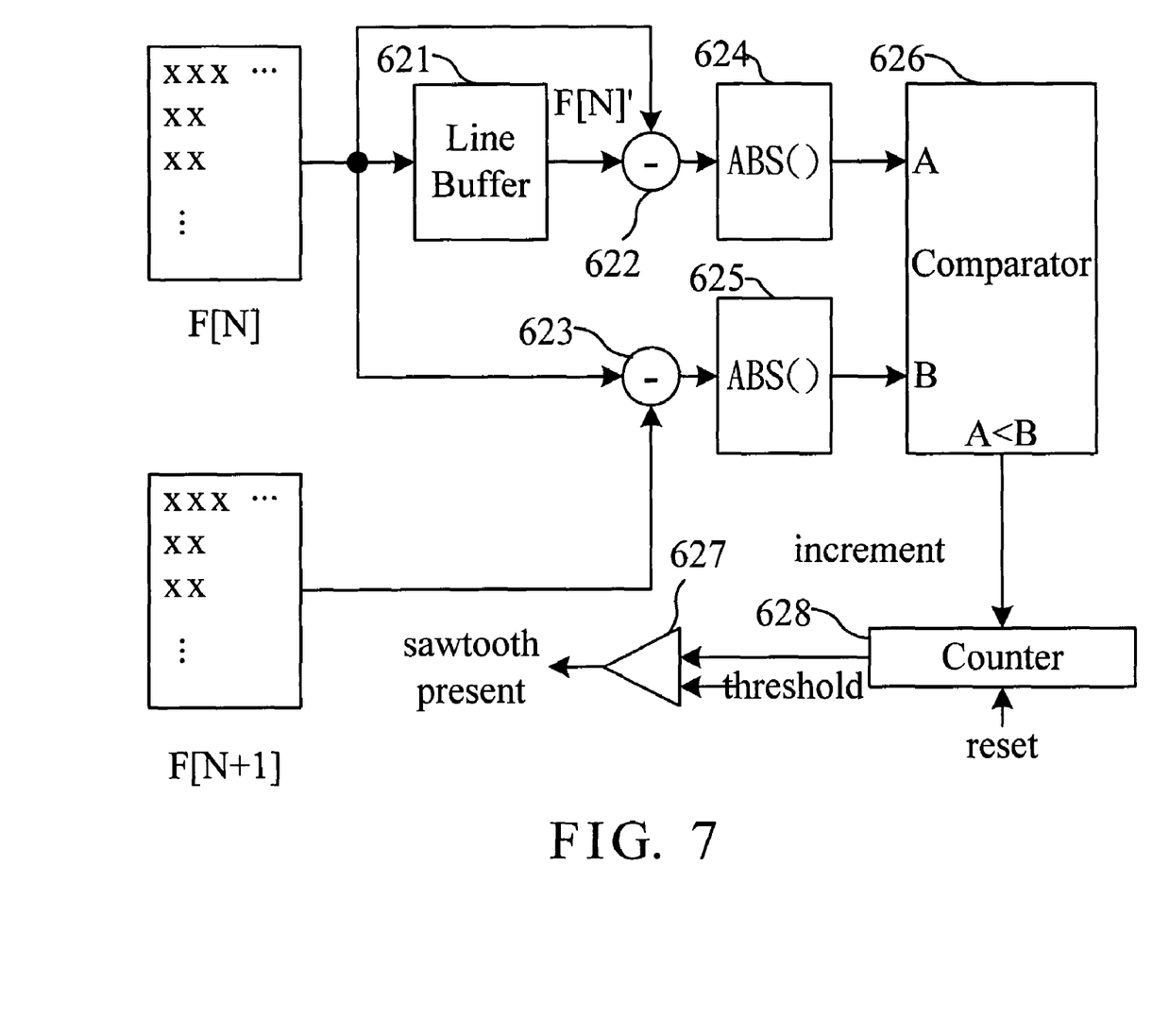
FIG. 7 is a block diagram of a sawtooth detector in accordance with the invention.

FIG. 7 is a block diagram of the sawtooth detector 620 in accordance with the invention. In FIG. 7, the sawtooth detector 620 includes a line buffer 621, subtractors 622 and 623, absolute devices 624 and 625, comparators 626 and 627 and a counter 628. For a sawtooth detection, the sawtooth detector 620 first uses a reset signal to reset the counter 628. The subtractor 623 subtracts the current field F[N] (with the pixel brightness $\text{Luma}_{F[N]}[i][j]$) from the next field F[N+1] (with the pixel brightness $\text{Luma}_{F[N+1]}[i][j]$) and a brightness difference between the fields F[N] and F[N+1] is obtained. Because one of the fields F[N] and F[N+1] is an odd field and the other is an even field, the distance between the fields F[N] and F[N+1] is one pixel in vertical. In addition, the brightness difference between the fields F[N] and F[N+1] is referred to as a frame energy of the current field F[N].

The line buffer 621 buffers a line of the current field F[N]. Accordingly, the pixel (i, j) of the current field F[N] is passed through the line buffer 621 to obtain a pixel (i+1, j), which is of a line buffered field F[N]', and the fields F[N]' and F[N] are subtracted by the subtractor 622 to thereby obtain a brightness difference between the fields F[N]' and F[N]. Because the pixel (i+1, j) is obtained by line buffering the pixel (i, j), the distance between the pixels (i+1, j) and (i, j) is two pixels in vertical. The brightness difference between the fields F[N]' and F[N] is referred to as a field vertical energy of the current field F[N].

The frame energy and field energy of the current field F[N] are passed through the absolute devices 624 and 625 to obtain the absolute values respectively for further comparison by the comparator 626. Since the distance between the fields F[N] and F[N+1] is smaller than the distance between the fields F[N]' and F[N], i.e., one pixel is smaller than two pixels, the frame energy is smaller than the field energy. If the comparator 626 finds the frame energy greater than the field energy, it may indicate an occurrence of sawtooth and the counter 628 is increased by one. When the counter 628 exceeds a threshold, a sawtooth present signal is output to inform the film mode detector 610 of leaving the film mode.

In this embodiment, the sawtooth detector 620 receives the current field F[N] and the next field F[N+1] respectively of the video datastream to thereby determine whether a sawtooth is present to the next field F[N+1] in accordance with the field energy of the current field F[N] and the frame energy of the current field F[N] and next field F[N+1]. In other embodiments, the sawtooth detector 620 can receive the current field F[N] and the previous field F[N−1] respectively of the video datastream to thereby determine whether a sawtooth is present to the current field F[N] in accordance with the field energy of the previous field F[N−1] and the frame energy of the previous field F[N−1] and current field F[N].

The scene detector 630 receives the current field F[N], the next field F[N+1] and the previous field F[N−1] in order to calculate a field rightness difference Diff_Luma between the current field F[N] and the previous and next fields F[N−1] and F[N+1], and accordingly determines whether a scene change occurs.

Figure 8:
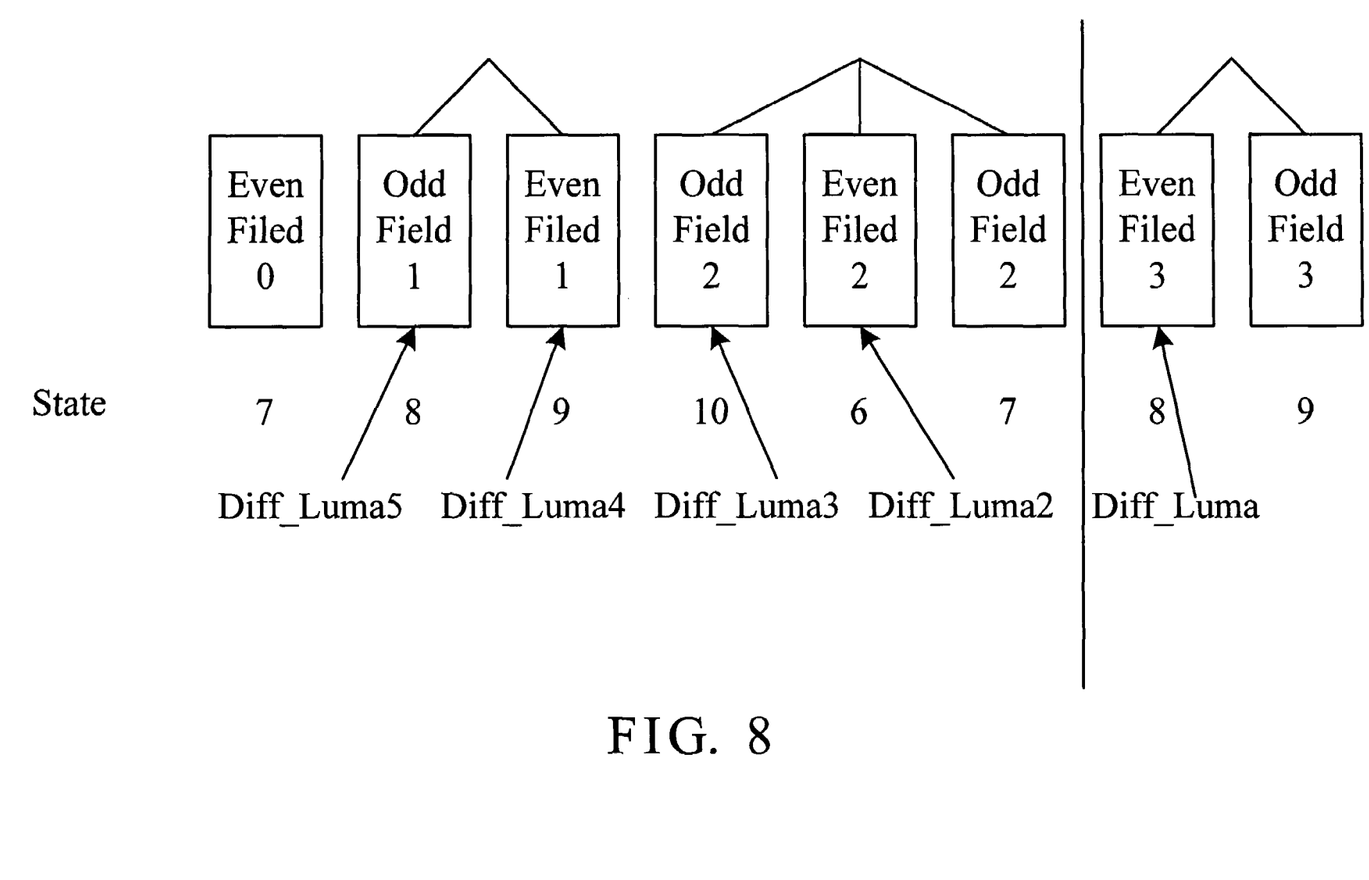
FIG. 8 is a schematic view of using a scene detector to calculate a field brightness difference of a current field in accordance with the invention.

FIG. 8 is a schematic view of using the scene detector 630 to calculate the field brightness difference Diff_Luma of the current field F[N] in accordance with the invention. The scene detector 630 depends on the following equation to calculate the field brightness difference Diff_Luma of the current field F[N]:

$$\text{Diff\_Luma} = \max(|Y_{F[N-1]} - Y_{F[N]}|, |Y_{F[N+1]} - Y_{F[N]}|), \quad (3)$$

where $Y_{F[N-1]}$ indicates a brightness average of the previous field F[N−1], $Y_{F[N]}$ indicates a brightness average of the current field F[N] and $Y_{F[N+1]}$ indicates a brightness average of the next field F[N+1]. The brightness average of the current field F[N] is expressed by:

$$Y_{F[N]} = \sum_{i=0}^{X-1} \sum_{j=0}^{Y-1} \text{Luma}_{F[N]}[i][j], \quad (4)$$

where $\text{Luma}_{F[N]}[i][j]$ indicates a brightness of pixel (i, j) of the current field F[N], X indicates the row number of the current field F[N] and Y indicates the column number of the current field F[N].

When the field brightness difference Diff_Luma corresponding to the current field F[N] is greater than a previous field brightness difference and a field brightness threshold Diff_Luma_Th, the scene detector 630 determines that the scene change occurs. The previous field brightness difference is obtained by selecting the maximum field brightness difference from the previous fields F[N−2], F[N−3], F[N−4] and F[N−5]. Namely, the scene detector 630 determines that the scene change occurs as the following equation (5) is found.

$$\text{Diff\_Luma} > \max(\text{Diff\_Lum\_2, 3, 4, 5}) \text{ and}$$
$$\text{Diff\_Luma} > \text{Diff\_Luma\_Th}, \quad (5)$$

where Diff_Lum_2, Diff_Lum_3, Diff_Lum_3 and Diff_Lum_5 indicate field brightness differences respectively of the previous fields F[N−2], F[N−3], F[N−4] and F[N−5], and Diff_Luma_Th indicates the field brightness threshold.

In other embodiments, the previous field brightness difference can be obtained by selecting the maximum field brightness difference from the previous fields F[N−2], F[N−3], F[N−4] and F[N−5] and performing a weighting operation. Namely, the scene detector 630 determines that the scene change occurs as the following equation (6) is found.

$$\text{Diff\_Luma} > \max(\text{Diff\_Luma\_2, 3, 4, 5}) \times \text{gain and}$$
$$\text{Diff\_Luma} > \text{Diff\_Luma\_Th} \quad (6)$$

The determinator 660 is connected to the film mode detector 610 and the scene detector 630. When the video datastream is of the film mode and the scene change occurs, the video datastream possibly containing a poor editing is determined. Namely, when the current field F[N] is at the film mode state 8 or 10 and the scene detector 630 determines at the previous state 7 or 9 that a scene change occurs, the current field F[N] possibly containing a poor editing can be determined. In this case, the multiplexer 670 selects the de-interlacing device 640 as the output to thereby produce the frame for the current field, but the state still remains at the film mode.

When the current field F[N] is at the film mode state 6, 7 or 9 and the sawtooth detector 620 determines at the previous state 10, 6 or 8 that a sawtooth is present to the next field F[N+1], the current field F[N] is determined to have a poor editing and the multiplexer 670 selects the de-interlacing device 640 as the output to thereby produce the frame for the current field F[N] and return to the state 0 (out of the film mode).

For the other conditions different from the cited above, the multiplexer 670 selects the direct coupler 650 as the output.

Figure 9:
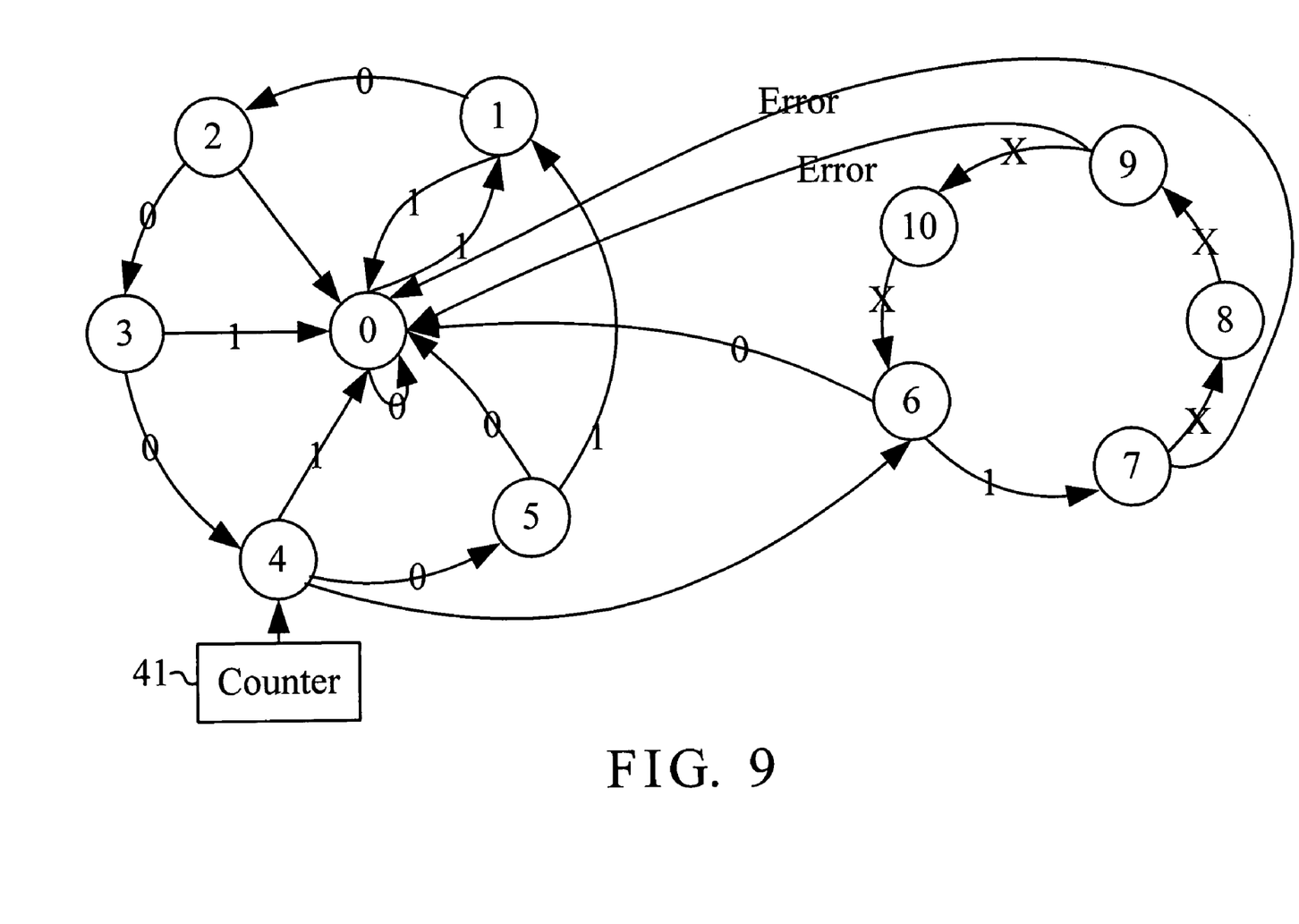
FIG. 9 is a state transition diagram of a system operation in accordance with the invention.

FIG. 9 is a state transition diagram of a system operation in accordance with the invention. As shown in FIG. 9, for one of the film mode states 6 to 10, a poor editing can be detected due to a scene change or sawtooth effect and further processed to thereby obtain a preferred image quality.

The prior art uses the sawtooth detector to determine whether a poor editing occurs or not, which can predict a poor editing of the next field F[N+1] and accordingly avoid the sawtooth occurrence when the current field F[N] and the next field F[N+1] are combined. However, when the next two fields F[N+1] and F[N+2] are combined, a frame buffer and a line buffer are required in combination with the sawtooth detector for detecting the poor editing, which increases the hardware cost. Otherwise, the sawtooth effect still occurs. By contrast, the invention uses the sawtooth detector 620 in combination with the scene detector 630 to thereby predict a poor editing. When the sawtooth effect is detected by the detector 620 and the film mode is at state 6, 7 or 9, it immediately goes out of the film mode. When a scene change is detected by the scene detector 630 and the film mode is at state 8 or 10, the multiplexer 670 selects the de-interlacing device 640 as the output to thereby produce the frame for the current field F[N] but still remain at the film mode. Thus, the different conditions for a poor editing occurrence are properly responded but no sawtooth effect occurs.

In view of foregoing, it is known that the invention combines the sawtooth detector 620 and the scene detector 630 to thereby avoid the video datastream from producing the sawtooth effect caused by a poor editing in directly coupling two adjacent fields. In addition, the use number of frame buffers and line buffers are reduced to further reduce the hardware cost. Thus, the different conditions for a poor editing presentation are detected and processed to thereby obtain a preferred image quality.

Although the present invention has been explained in relation to its preferred embodiment, it is to be understood that many other possible modifications and variations can be made without departing from the spirit and scope of the invention as hereinafter claimed.

What is claimed is:

1. A video editing detection system, which receives plural fields of a video datastream for detecting a video editing in the video datastream, the system comprising:
   a film mode detector, which receives a previous field F[N−1] and a next field F[N+1] respectively of the video datastream to accordingly determine whether the video datastream is a film mode or not;
   a sawtooth detector, which receives a current field F[N] and the next field F[N+1] respectively of the video datastream to thereby determine whether a sawtooth is present to the next field F[N+1] based on a field energy of the current field F[N] and a frame energy of the current field F[N] and next field F[N+1]; and
   a scene detector, which receives the current field F[N], the next field F[N+1] and the previous field F[N−1] in order to calculate a field brightness difference between the current field F[N] and the previous and next fields F[N−1] and F[N+1], and accordingly determines whether a scene change occurs;

wherein, when the video datastream is the film mode and the scene change occurs, the video datastream is determined to have the video editing.

2. The system as claimed in claim 1, wherein the film mode detector is based on a film detection state transition diagram to determine that the video datastream is of the film mode or a video mode, states 0 to 5 of the film detection state transition diagram are video mode states 0 to 5, and states 6 to 10 of the film detection state transition diagram are film mode states 6 to 10; and wherein the film mode detector sequentially produces film mode states 6 to 10 when the video datastream is of the film mode, and further determines the current field F[N] as the video editing when the current field F[N] is at the film mode state 8 or 10 and the scene detector determines at a previous film mode state 7 or 9 that the scene change occurs, for the previous film mode state 7 corresponds to the film mode state 8 and the previous film mode state 9 corresponds to the film mode state 10.

3. The system as claimed in claim 2, wherein the current field F[N] is further determined as the video editing when the current field F[N] is at the film mode state 6, 7 or 9 and the sawtooth detector determines at a previous film mode state 10, 6 or 8 that the sawtooth is present to the next field F[N+1], for the previous film mode state 10 corresponds to the film mode state 6, the previous film mode state 7 corresponds to the film mode state 6 and the previous film mode state 9 corresponds to the film mode state 10.

4. The system as claimed in claim 3, wherein the current field F[N] has the field brightness difference expressed by $$\max(|Y_{F[N-1]}-Y_{F[N]}|, |Y_{F[N+1]}-Y_{F[N]}|),$$

where $Y_{F[N-1]}$ indicates a brightness average of the previous field F[N−1], $Y_{F[N]}$ indicates a brightness average of the current field F[N] and $Y_{F[N-1]}$ indicates a brightness average of the next field F[N+1].

5. The system as claimed in claim 4, wherein the brightness average of the current field F[N] is expressed by:

$$Y_{F[N]} = \sum_{i=0}^{X-1} \sum_{j=0}^{Y-1} \text{Luma}_{F[N]}[i][j],$$

where $\text{Luma}_{F[N]}[i][j]$ indicates a brightness of pixel (i, j) of the current field F[N], X indicates the row number of the current field F[N] and Y indicates the column number of the current field F[N].

6. The system as claimed in claim 5, wherein the field brightness difference corresponding to the current field F[N] is greater than a previous field brightness difference and a field brightness threshold, the scene detector determines that the scene change occurs.

7. The system as claimed in claim 6, wherein the previous field brightness difference is obtained by selecting a maximum field brightness difference from previous fields F[N−2], F[N−3], F[N−4] and F[N−5].

8. The system as claimed in claim 6, wherein the previous field brightness difference is obtained by selecting a maximum field brightness difference from previous fields F[N−2], F[N−3], F[N−4] and F[N−5] and performing a weighting operation.

9. The system as claimed in claim 3, wherein the sawtooth detector determines that the sawtooth is present to the next field F[N+1] when the frame energy is greater than the number of pixels of the field energy of the current field F[N] and exceeds a threshold.

10. The system as claimed in claim 9, wherein the field energy of a pixel is expressed by:

$$|\text{Luma}_{F[N]}[i][j]-\text{Luma}_{F[N]}[i+1][j]|,$$

where $\text{Luma}_{F[N]}[i][j]$ indicates a brightness of a pixel (i, j) of the current field F[N] and $\text{Luma}_{F[N]}[i+1][j]$ indicates a brightness of a pixel (i+1, j) of the current field F[N].

11. The system as claimed in claim 10, wherein the frame energy of the pixel is expressed by:

$$|\text{Luma}_{F[N]}[i][j]-\text{Luma}_{F[N+1]}[i][j]|,$$

where $\text{Luma}_{F[N]}[i][j]$ indicates a brightness of the pixel (i, j) of the current field F[N] and $\text{Luma}_{F[N+1]}[i][j]$ indicates a brightness of the pixel (i, j) of the next field F[N+1].

12. The system as claimed in claim 3, further comprising a de-interlacing device, which receives the current field F[N], the previous field F[N−1] and the next field F[N+1] and accordingly is driven to produce the frame for the current field F[N] when the video datastream is determined to have the video editing.

13. The system as claimed in claim 1, further comprising a direct coupler, which receives the current field F[N], the previous field F[N−1] and the next field F[N+1] and combines the previous filed field F[N−1] and the next field F[N−1] or the next field F[N+1] and the current field F[N] to thereby produce the frame for the current field [N] when the video datastream is determined to have no video editing.

\* \* \* \* \*